US006345569B1

United States Patent
Take et al.

(10) Patent No.: US 6,345,569 B1
(45) Date of Patent: Feb. 12, 2002

(54) PISTON FOR INTERNAL COMBUSTION ENGINE

(75) Inventors: Kazuhide Take; Reiko Hiraide; Noriaki Kawai, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/490,150

(22) Filed: Jan. 24, 2000

(30) Foreign Application Priority Data

Jan. 29, 1999 (JP) ............................................ 11-022961
Nov. 17, 1999 (JP) ............................................ 11-326721

(51) Int. Cl.[7] ................................................ F16J 1/04
(52) U.S. Cl. ......................................... 92/233; 92/208
(58) Field of Search .................. 92/208, 233; 123/193.6

(56) References Cited

U.S. PATENT DOCUMENTS 4,831,919 A * 5/1989 Bruni ............................ 92/233
5,299,490 A * 4/1994 Harrer et al. .................. 92/233
5,379,680 A * 1/1995 Bohm et al. ................... 92/208
5,682,808 A * 11/1997 Nakada ......................... 92/233

FOREIGN PATENT DOCUMENTS

JP          53-30564          7/1978

* cited by examiner

Primary Examiner—Edward K. Look
Assistant Examiner—Thomas E. Lazo
(74) Attorney, Agent, or Firm—Arent, Fox, Kintner, Plotkin & Kahn, PLLC

(57) ABSTRACT

An object of the present invention is to effectively achieve the reduction in piston slap sound in both of an expansion stroke and a compression stroke in consideration of a difference between the behaviors of a piston in the expansion stroke and the compression stroke. For this purpose, in a piston P having a skirt 12 formed into an intermediately bulged barrel type, the axis $L_2$ of a piston pin is offset with respect to the cylinder axis $L_1$, and the decrement in radius of a lower skirt portion 20 is set to be large on a thrust side and small in an anti-thrust side. In the expansion stroke, the piston is positively swung, while the skirt 12 is put into abutment against a wall surface of a cylinder bore, thereby reducing the piston slap sound.

1 Claim, 12 Drawing Sheets

FIG. 5A COMPRESSION STROKE

FIG. 5B COMPRESSION STROKE

FIG. 5C COMPRESSION STROKE

ASYMMETRIC BARREL TYPE

COMPRESSION STROKE

EMBODIMENT

CONVENTIONAL EXAMPLE AMOUNT OF ELLIPSE 0.3 mm

CONVENTIONAL EXAMPLE AMOUNT OF ELLIPSE 0.1 mm

VIBRATION OF CYLINDER

FIG.11A

ASYMMETRIC BARREL TYPE

EXPANSION STROKE

EMBODIMENT

CONVENTIONAL EXAMPLE AMOUNT OF ELLIPSE 0.3 mm

CONVENTIONAL EXAMPLE AMOUNT OF ELLIPSE 0.1 mm

VIBRATION OF CYLINDER

FIG. 13B NON-BARREL TYPE (α = 1.0 mm) COMPRESSION STROKE

EMBODIMENT

CONVENTIONAL EXAMPLE AMOUNT OF ELLIPSE 0.3 mm

CONVENTIONAL EXAMPLE AMOUNT OF ELLIPSE 0.1 mm

VIBRATION OF CYLINDER

FIG. 13A NON-BARREL TYPE (α = 1.0 mm) EXPANSION STROKE

EMBODIMENT

CONVENTIONAL EXAMPLE AMOUNT OF ELLIPSE 0.3 mm

CONVENTIONAL EXAMPLE AMOUNT OF ELLIPSE 0.1 mm

VIBRATION OF CYLINDER

PISTON FOR INTERNAL COMBUSTION ENGINE

BACKGROUND OF THE INVENTION

1. Field of the Invention

The present invention relates to a piston having a skirt for an internal combustion engine, and particularly, to the shape of a piston for reducing the piston slap sound of a piston.

2. Description of the Related Art

In a piston for an internal combustion engine, which includes a piston pin having an axis offset with respect to an axis of a cylinder, and a skirt formed into an intermediately bulged barrel type, a technique is known from Japanese Utility Model Publication No.53-40564, of partially cutting away that upper portion of the skirt located on a side opposite to the offset side of the piston pin, which is liable to cause a scoring and a spotting between such portion and a wall surface of a cylinder bore, thereby preventing the occurrence of a seizure.

The skirt of the barrel type is intended to reduce the piston slap sound generated by the collision of the piston against the wall surface of the cylinder bore, but in the above known piston, an improvement has been made in the barrel shape of the upper portion of the skirt from the viewpoint of the lubrication of the piston. This does not contribute to a reduction in piston slap sound.

SUMMARY OF THE INVENTION

Accordingly, it is an object of the present invention to ensure that reductions in piston slap sound in both of an expansion stroke and a compression stroke are reconciled effectively in consideration of the differences in behavior of the piston and in thrust force between the expansion stroke and the compression stroke.

To achieve the above object, according to a first aspect and feature of the present invention, there is provided a piston for an internal combustion engine, including a barrel-type skirt comprised of an upper skirt portion provided above a maximum-diameter portion and a lower skirt portion provided below the maximum-diameter portion, the upper and lower skirt portions having radii smaller than that of the maximum-diameter portion, wherein a decrement in radius of the lower skirt portion on an anti-thrust side is set smaller than a decrement in radius of the lower skirt portion on a thrust side.

With the above arrangement, when the piston is swung in an expansion stroke, while the lower skirt portion, the maximum-diameter portion and the upper skirt portion of the piston on the thrust side are put sequentially in the named order into abutment against a wall surface of the cylinder bore, the swinging movement of the piston can be permitted, and the collision of the skirt against the wall surface of the cylinder bore can be moderated to reduce the piston slap sound, owing to a sufficient decrement in radius of the lower skirt portion ensured on the thrust side.

In a compression stroke, the lower skirt portion on the anti-thrust side is first put into abutment against the wall surface of the cylinder bore, and on the subsequent swinging movement of the piston, the upper skirt portion on the anti-thrust side collides against the wall surface of the cylinder bore to generate the piston slap sound. However, since the decrement in radius of the lower skirt portion on the anti-thrust side is set small, the inclination angle of the piston that is generated upon the abutment of the lower skirt portion on the anti-thrust side against the wall surface of the cylinder bore can be suppressed to a small value, and the shock provided upon the collision of the upper skirt portion on the anti-thrust side caused by the subsequent swinging movement of the piston in an opposite direction can be alleviated to reduce the piston slap sound.

The decrement in radius of the lower skirt portion is provided to be asymmetric on the thrust side and the anti-thrust side in the above manner, whereby the reduction in piston slap sound can be effectively achieved in both of the expansion stroke and the compression stroke.

According to a second aspect and feature of the present invention, there is provided a piston for an internal combustion engine having a skirt, wherein the curvature of a cross section of the skirt on an anti-thrust side is set smaller than that of the cross section of the skirt on a thrust side, and at least a portion of the cross section of the skirt on the anti-thrust side is formed in an arc of circle.

With the above arrangement, the curvature of the cross section of the skirt on the anti-thrust side is set smaller than that on the thrust side, and at least a portion of the cross section of the skirt on the anti-thrust side is formed in the arc of circle. Therefore, the surface pressure of contact of the piston with the wall surface of a cylinder bore can be reduced in a compression stroke to reduce the piston slap sound and to enhance the seizure-resistance performance.

According to a third aspect and feature of the present invention, in addition to the second feature, there is provided a piston for an internal combustion engine, wherein the arc of circle is formed with a center angle of 10° or more on each of opposite sides of an axis extending through a central axis of the piston to the thrust side and to the anti-thrust side.

With the above arrangement, the arc of circle is formed with the center angle of 10° or more on each of the opposite sides of the axis. Therefore, the surface pressure of contact of the piston with the wall surface of the cylinder bore can be reduced sufficiently in a compression stroke.

The above and other objects, features and advantages of the invention will become apparent from the following description of the preferred embodiments taken in conjunction with the accompanying drawings.

BRIEF DESCRIPTION OF THE DRAWINGS

FIGS. 1 to 13B show embodiments of the present invention, wherein

FIGS. 1 to 13B show an embodiment of the present invention,

DESCRIPTION OF THE PREFERRED EMBODIMENT

The present invention will now be described by way of embodiments with reference to the accompanying drawings.

Figure 1:
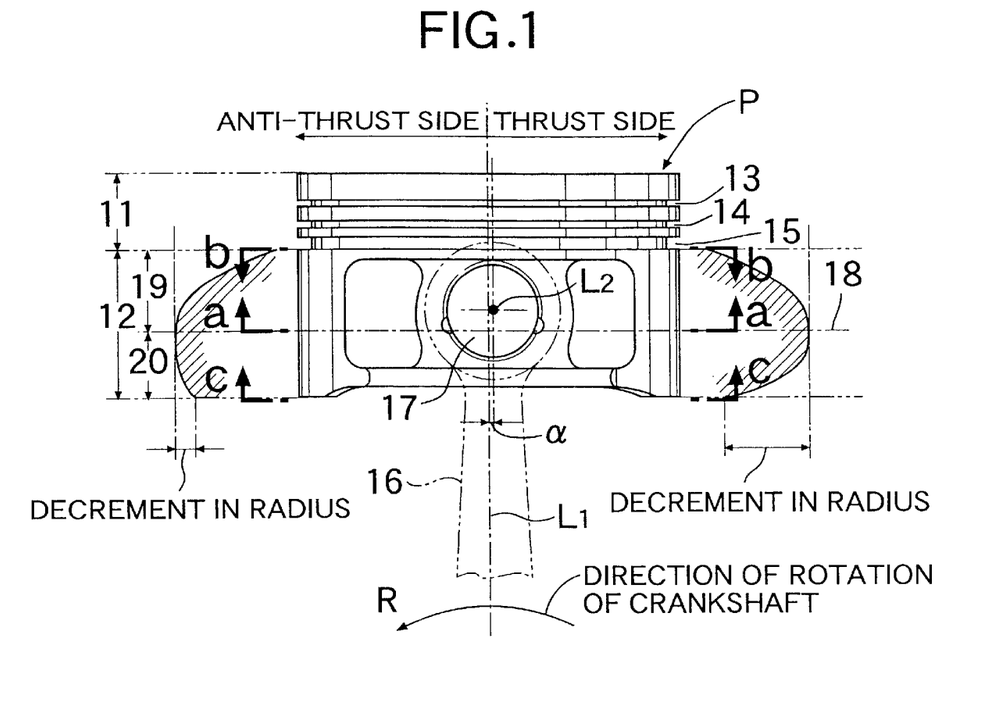
FIG. 1 is a side view of a piston for an internal combustion engine according to an embodiment.

A piston P for a 4-cycle internal combustion engine according to a first embodiment, shown in FIG. 1, includes a piston top 11 facing a combustion chamber, and a skirt 12 facing a crank chamber. Two compressed-ring mounting grooves 13 and 14 and a single oil ring mounting groove 15 are defined in the piston top 11. A connecting rod 16 is oscillatably connected at its smaller end to the skirt 12 through a piston pin 17.

The cross-sectional shape of the skirt 12 of the piston P is continuously changed in a direction along a cylinder axis $L_1$. More specifically, the skirt 12 has a maximum-diameter portion 18 in its vertical middle (in the direction of the cylinder axis $L_1$), and an upper skirt portion 19 and a lower skirt portion 20 are partitioned from each other by the maximum-diameter portion 18. The maximum-diameter portion 18 is that portion of the skirt 12 which has a maximum outside diameter. As emphatically shown in FIG. 1, the upper skirt portion 19 is decreased more and more in radius about the cylinder axis $L_1$ as being farther upwards from the maximum-diameter portion 18, and the lower skirt portion 20 decreased more and more in radius about the cylinder axis $L_1$ as being farther downwards from the maximum-diameter portion 18. The decrement in radius of the upper skirt portion 19 on the thrust side of the piston P is the same as on the anti-thrust side of the piston P, but the decrement in radius of the lower skirt portion 20 is set so that it is larger on the thrust side of the piston P and smaller on the anti-thrust side of the piston P. The entire skirt 12 of the piston P is of such a barrel-shape that the vertically intermediate portion (the maximum-diameter portion) is the thickest, and the vertically opposite ends (the upper skirt portion 19 and the lower skirt portion 20) are slightly thinner.

Figure 3A:
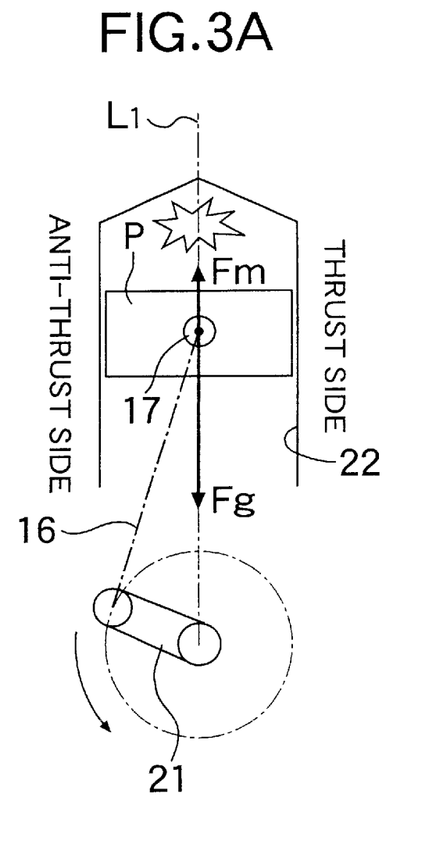
FIGS. 3A and 3B are diagrams for explaining the definition of "thrust side" and "anti-thrust side"
Figure 3B:
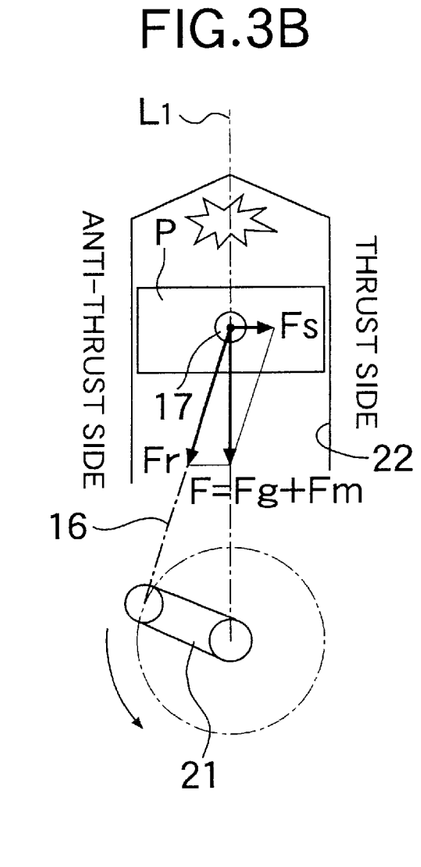

The definitions of "the thrust side" and "the anti-thrust side" will be described below. FIGS. 3A and 3B show an expansion stroke of the 4-cycle internal combustion engine. In the expansion stroke, a downward load Fg provided by an internal pressure in a cylinder caused by the explosion of a fuel-air mixture and an upward inertial force Fm provided by a reciprocation mass are applied to the piston P. Therefore, a force F (=Fg+Fm) in the direction of the cylinder axis $L_1$ is applied to the piston P and divided into a force component Fr in a direction of the connecting rod 16 and a force component Fs in a direction perpendicular to the cylinder axis $L_1$.

The force component Fs is a force for urging the side of the piston P against a wall surface of a cylinder bore 22, and is called a thrust force of the piston. The magnitude of the thrust force Fs assume a maximum value at the expansion stroke at which an explosion load is received. The direction of the thrust force Fs generated at this time (the right side in FIGS. 3A and 3B) is called "the thrust side", and the opposite direction thereof (the left side in FIGS. 3A and 3B) is called "the anti-thrust side".

As shown in FIG. 1, an axis $L_2$ of the piston pin is offset by a distance a to the thrust side (to the right side in FIG. 1) with respect to the cylinder axis $L_1$. The distance a is a very small amount, e.g., on the order of 0.5 mm.

There is a well-known technique for reducing the frictional resistance by ensuring that the cross-sectional shape of a skirt 12 can be approximated to a true circle upon the thermal expansion of a piston P by forming the skirt 12 of the piston P into an elliptic cross-sectional shape having a short axis extending in a direction of a piston pin axis $L_2$ and a long axis extending in a direction of an axis $L_3$ perpendicular to the piston pin axis $L_2$. On the contrast, in this embodiment, the cross-sectional shape of the skirt 12 is established asymmetrically on the thrust side and on the anti-thrust side.

Figure 2:
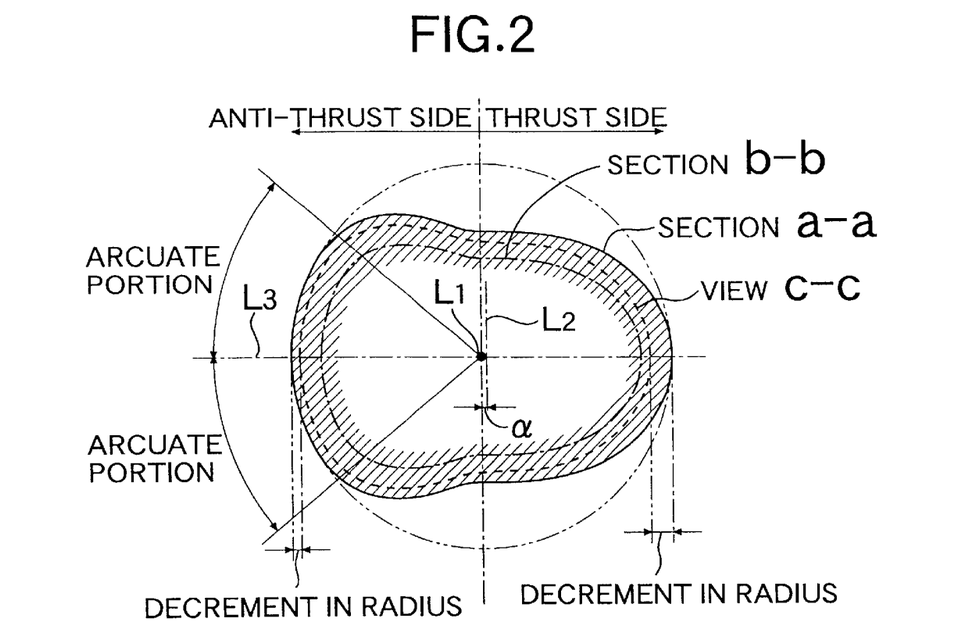
FIG. 2 is a cross-sectional view of the piston.

A solid line in FIG. 2 shows a sectional shape taken in a direction of an arrow a—a in FIG. 1 by cutting the skirt 12 of the piston P at the maximum-diameter portion 18. As can be seen from FIG. 2, the sectional shape of the entire skirt 12 taken in the direction of the arrow a—a at the maximum-diameter portion 18 is a non-circular shape having a smaller diameter in the direction of the piston pin axis $L_2$ and a larger diameter in the direction of the axis $L_3$ perpendicular to the piston pin axis $L_2$, and moreover, the skirt 12 is formed asymmetrically on the thrust side and on the anti-thrust side. Further specifically, the sectional shape of the skirt 12 taken in the direction of the arrow a—a on the thrust side is elliptic with a short axis extending in the piston pin axis $L_2$, while the cross-sectional shape of each of those portions of the skirt 12 on the anti-thrust side, which are in predetermined areas on opposite sides of the axis $L_3$ perpendicular to the piston pin axis $L_2$, is arcuate about the cylinder axis $L_1$. Opposite ends of the arcuate portion are connected to opposite ends of the elliptic portion on the thrust side by a smooth curve.

A one-dot dashed line in FIG. 2 shows a sectional shape of the upper skirt portion of the piston P taken in a direction of an arrow b—b. As can be seen from FIG. 2, the entire piston P is formed into a barrel shape and hence, the sectional shape taken in the direction of the arrow b—b is smaller over the entire region than the sectional shape taken in the direction of the arrow a—a at the maximum diameter portion 18. A dashed line in FIG. 2 shows a shape of the lower skirt portion 20 of the piston P taken in a direction of an arrow c—c. Since the entire piston P is formed into the barrel shape, the shape of the lower skirt portion 20 taken in the direction of the arrow c—c is smaller over the entire region than the sectional shape of the maximum-diameter portion 18 taken in the direction of the arrow a—a, but the decrement in radius is set, so that it is larger on the thrust side and smaller on the anti-thrust side, as described above. The sectional shape of the piston P and the shapes of the piston P taken in the direction of the arrows are emphatically represented, and the magnitude of the actual decrement in radius is on the order of several ten μm.

The operation at the expansion stroke will be described below with reference to FIGS. 4A to 4C.

Figure 4A:
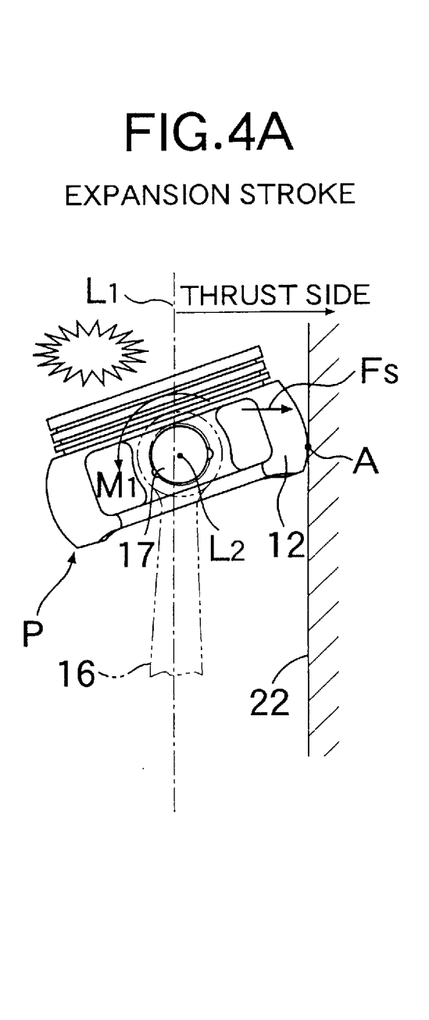
FIGS. 4A to 4C are diagrams for explaining the operation in an expansion stroke.
Figure 4B:
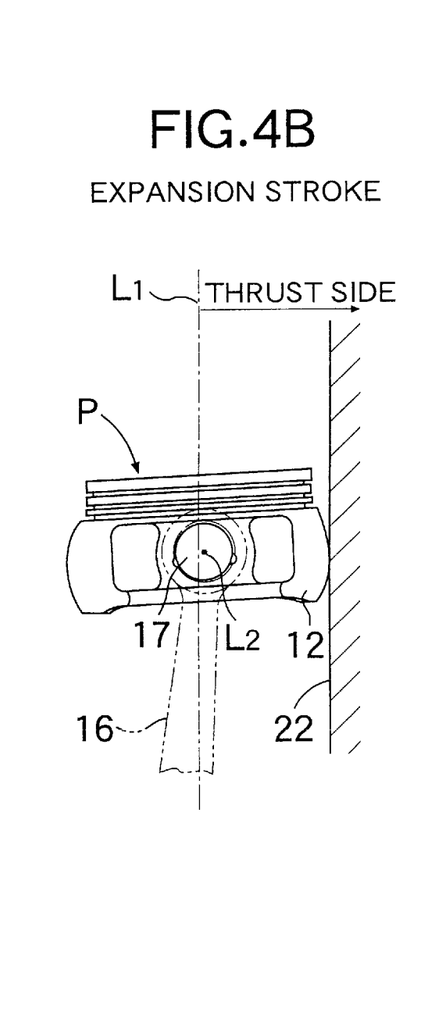
Figure 4C:
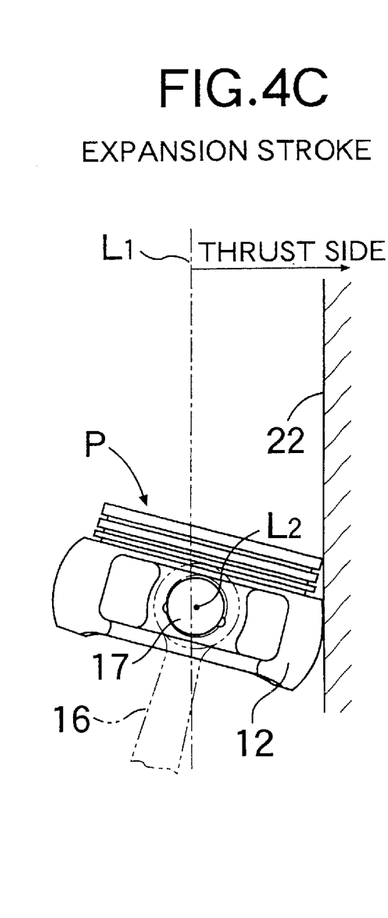

FIG. 4A shows a state in which the piston P is in the vicinity of a top dead center and which is provided immediately after explosion of the fuel-air mixture in the combustion chamber. When the pressure of combustion gas urges the top surface of the piston P downwards, a moment $M_1$ is applied about the piston pin axis $L_2$ by the pressure of the combustion gas, because the piston pin axis $L_2$ is offset to the thrust side with respect to the cylinder axis $L_1$. This causes the piston P to be swung in a counterclockwise direction, whereby a lower end of the skirt 12 on the thrust side is brought into abutment against a wall surface of the cylinder bore 22 at a point A.

In the expansion stroke, an upper end of the connecting rod 16 is inclined to the thrust side with respect to the cylinder axis $L_1$, thereby generating the thrust force Fs for urging the piston P against a right wall surface of the cylinder bore 22. At this time, the lower end of the skirt 12 on the thrust-side of the piston P is in abutment against the wall surface of the cylinder bore 22 and hence, a clockwise moment is generated about the point A by the thrust force Fs, whereby the piston P is swung in a clockwise direction, while its portions between the lower and upper ends of the skirt 12 are sequentially brought into contact with the wall surface of the cylinder bore 22 (see FIGS. 4B and 4C).

When the piston P is lowered while being swung in the clockwise direction during the expansion stroke, as described above, the decrement in radius of the lower skirt portion 20 of the piston P is ensured largely on the thrust side in abutment against the wall surface of the cylinder bore 22 (see FIG. 1). Therefore, the angle of swinging of the piston P in the clockwise direction can be ensured sufficiently to reduce the piston slip sound. Supposing that the swinging movement of the piston P in the clockwise direction is inhibited, the piston P strongly collides against the wall surface of the cylinder bore 22 on the thrust side under the action of the thrust force Fs without being swung and hence, a large piston slap sound is generated at that time.

Figure 6A:
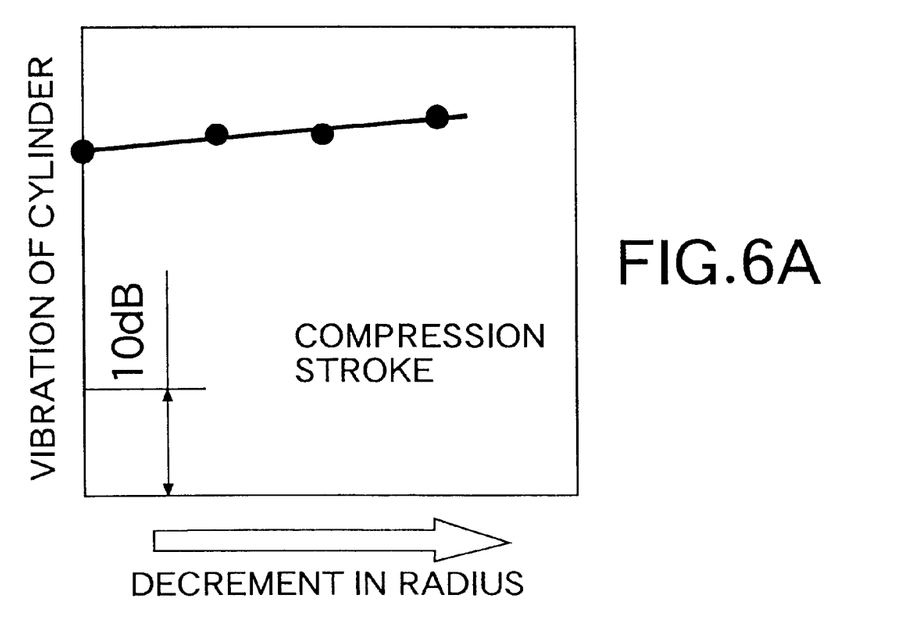
FIGS. 6A and 6B are graphs showing the relationship between the decrement in radius of a lower skirt portion and the vibration of a cylinder in the compression stroke and the expansion stroke.
Figure 6B:
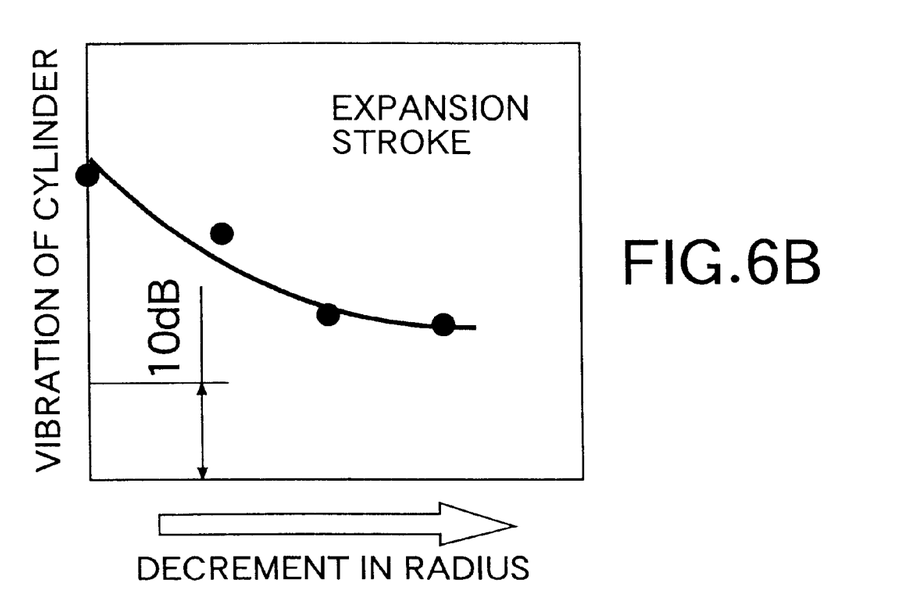

In the above-described expansion stroke, the piston slap sound (i.e., the vibration of the cylinder) can be reduced by increasing the decrement in radius of the lower skirt portion 20 on the thrust side (see FIG. 6B). On the contrast, in a compression stroke, if the decrement in radius of the lower skirt portion 20 on the anti-thrust side Is increased, the piston slap sound (i.e., the vibration of the cylinder) Is increased correspondingly, resulting in an adverse effect (see FIG. 6A). This is because the behaviors of the piston Pin the expansion stroke and the compression stroke are different from each other.

The operation in the compression stroke will be described below with reference to FIGS. 5A to 5C.

As already described with reference to FIGS. 3A and 3B, the load provided by the internal pressure in the cylinder and the Inertial force provided by the reciprocation mass are applied to the piston P. When the Internal pressure in the cylinder is large as on the full opening of a throttle valve, the thrust force in the anti-thrust direction is large, whereby the piston P is lifted along the wall surface of the cylinder bore 22 on the anti-thrust side. However, during light loading or racing in which the internal pressure in the cylinder is small, a point B of the lower portion of the skirt 12 is brought into abutment against the wall surface of the cylinder bore 22 on the anti-thrust side by (1) negative pressure (an upward force) generated in the cylinder at an initial stage (in the vicinity of 40° from a bottom dead center) of the compression stroke and (2) a clockwise moment $M_2$ generated by the piston pin 17 offset to the thrust side.

Subsequently, the piston P, gradually starting from near the middle between bottom and top dead centers at which the direction of the inertial force is changed, is moved away from the wall surface of the cylinder bore 22 on the anti-thrust side by the thrust force generated in the thrust direction (see FIG. 5B). Thereafter, the piston P is moved to collide against the wall surface of the cylinder bore 22 on the anti-thrust side, starting from a point C of the upper portion of the skirt 12, by (1) an increase in internal pressure in the cylinder and (2) a counterclockwise moment $M_3$ generated by the piston pin 17 offset to the thrust side, thereby generating a piston slap sound (see FIG. 5C).

Figure 5A:
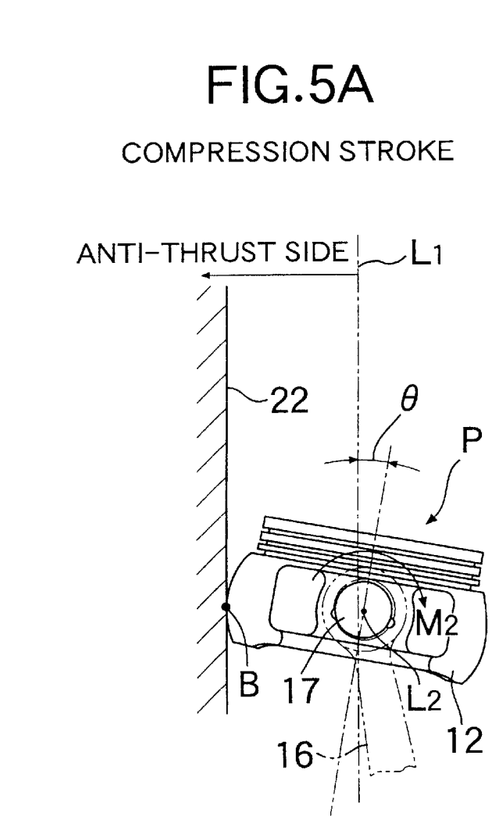
FIGS. 5A to 5C are diagrams for explaining the operation in a compression stroke.
Figure 5B:
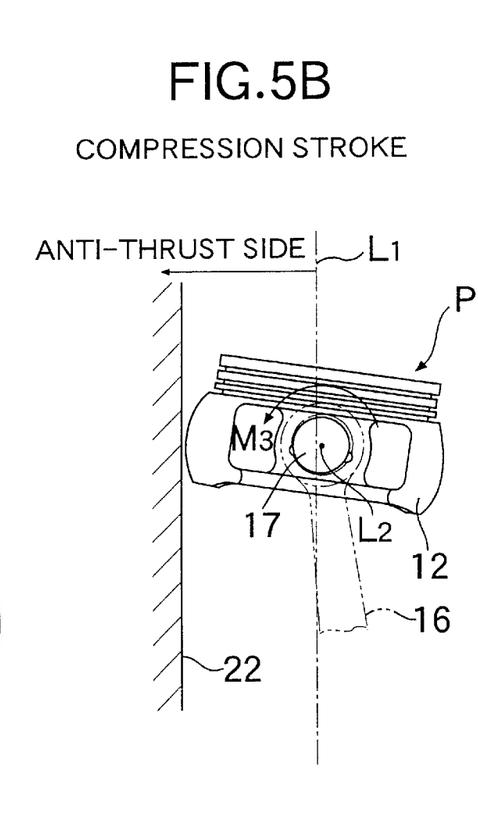
Figure 5C:
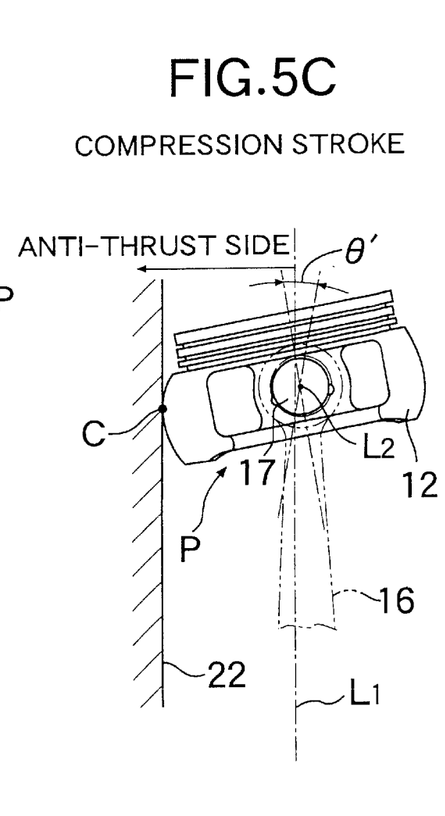

To reduce the piston slap sound, it is effective to suppress, to a small level, the angle θ of clockwise swinging movement of the piston P which is in a state shown in FIG. 5A. This is because if the angle θ of clockwise swinging movement of the piston P is small, the angle θ (see FIG. 5C) of counterclockwise swinging movement of the piston P from the state in which the piston P has been swung by the angle θ in the clockwise direction to a state of the upper end of the skirt 12 on the anti-thrust side coming into collision against the wall surface of the cylinder bore 22 is made small and hence, an increase in collision speed can be avoided.

With this respect in view, the decrement in radius of the lower skirt portion 20 of the piston P on the anti-thrust side is set at a small value in this embodiment (see FIG. 1). Therefore, when the lower end of the skirt 12 on the anti-thrust side in the state shown in FIG. 5A is put into abutment against the wall surface of the cylinder bore 22, the angle θ of clockwise swinging movement of the piston P can be suppressed to a small level and as a result, the piston slap sound can be reduced.

As described above, in the expansion stroke, the barrel shape of the skirt 12 of the piston P ensures that the piston P is positively swung, whereby the piston slap sound is reduced, on the one hand, and in the compression stroke, the piston slap sound reducing effect provided by the barrel shape cannot be expected. Therefore, The cross-sectional shape of the skirt 12 is asymmetric on the thrust side and on the anti-thrust side in the compression stroke, whereby the reduction in piston slap sound is provided. More specifically, the provision of the arcuate surface of the cross section of the skirt on the anti-thrust side ensures that the area of contact of the cross section of the skirt 12 with the wall surface of the cylinder bore 22 on the anti-thrust side is larger than that on the thrust side, so that the surface pressure of contact of the piston P with the wall surface of the cylinder bore 22 in the compression stroke can be decreased to provide a reduction in piston slap sound. In this case, an enhancement in seizure-resistance performance can be also achieved by the decrease in surface pressure of contact of the piston P with the wall surface of the cylinder bore 22.

This will be described in detail. To reduce the piston slap sound, it is effective to ensure that the skirt 12 of the piston P is brought over its wide area into contact with the wall surface of the cylinder bore 22, leading to a reduced surface pressure of contact. However, appropriate values of curvatures of the cross sections of the skirt 12 on the thrust side and on the anti-thrust side are largely different from each other. This is because the thrust forces on the thrust side largely influenced by the internal pressure in the cylinder and on the anti-thrust side little influenced by the internal pressure in the cylinder are different largely from each other.

Figure 7A:
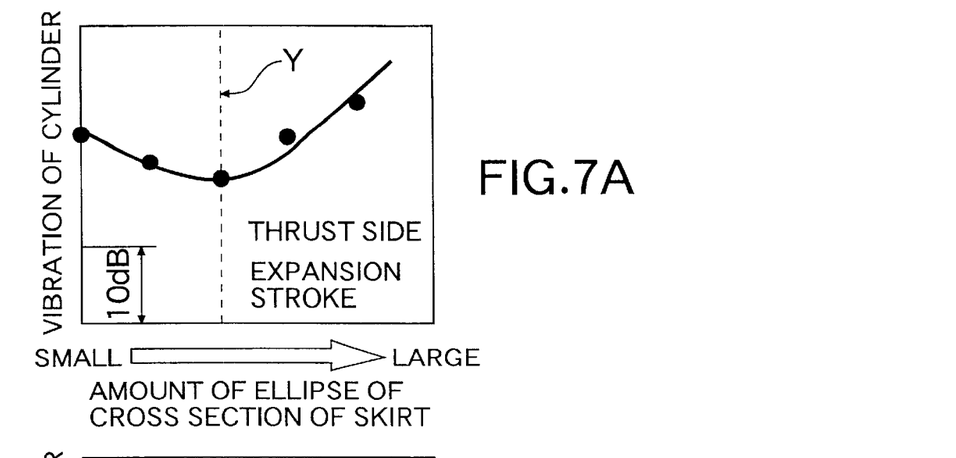
FIGS. 7A to 7C are graphs showing the relationship between the amount of ellipse of the cross section of the skirt, as well as the relationship between the center angle of an arcuate portion of the cross section of the skirt and the vibration of the cylinder.

FIG. 7A shows the relationship between the amount of ellipse of the cross section of the skirt 12 on the thrust side and the vibration of the cylinder. The amount of ellipse is defined by a deviation D-d between a long axis D and a short axis d of the ellipse. If the amount of ellipse is larger, the curvature of the cross section is larger, and if the amount of ellipse is smaller, the curvature of the cross section is smaller. As can be seen from FIG. 7A, if the amount of ellipse of the cross section of the skirt 12 on the thrust side is decreased, so that the cross-sectional shape of the skirt 12 approximates an arcuate shape, the vibration of the cylinder is gradually decreased at the beginning. However, if the amount of ellipse is further decreased, the vibration of the cylinder is diverted to an increase with a threshold value Y being as a boundary. This is because if the cross-section of the skirt 12 is formed into the shape approximating the arcuate shape, the surface pressure in the direction of a side wall supporting the surface of the skirt and having a high rigidity rises locally and as a result, the vibration of the cylinder is increased.

Figure 7B:
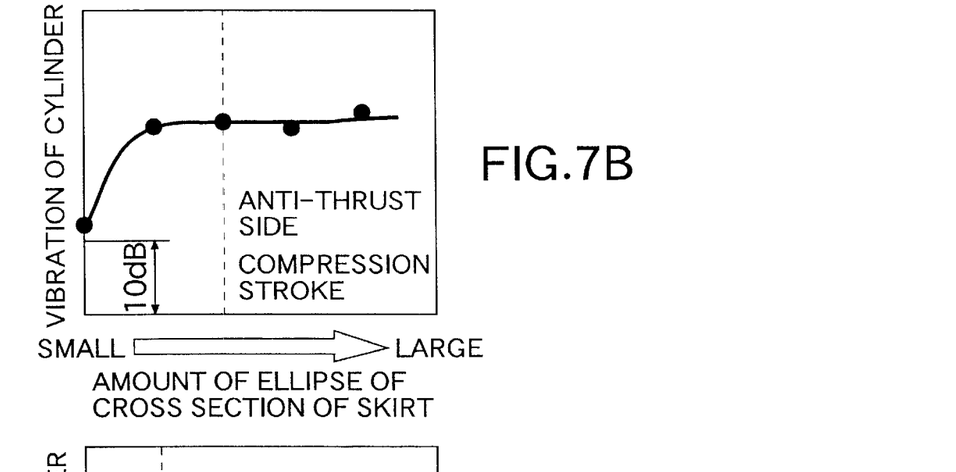

FIG. 7B shows the relationship between the amount of ellipse of the cross section of the skirt 12 on the anti-thrust side and the vibration of the cylinder. As can be seen from FIG. 7B, even if the amount of ellipse of the cross section of the skirt 12 on the anti-thrust side is decreased, so that the cross-sectional shape of the skirt 12 approximates an arcuate shape, the vibration of the cylinder is little decreased at the beginning. However, if the amount of ellipse is further decreased to exceed the threshold value Y, so that the cross-sectional shape of the skirt 12 approximates an arcuate shape, the vibration of the cylinder is decreased drastically.

From this fact, it can be seen that in order to reduce the piston slap sound in the compression stroke, it is effective to sufficiently decrease the amount of ellipse of the cross section of the skirt 12 on the anti-thrust side, so that the cross-sectional shape of the skirt 12 approximates the arcuate shape.

Figure 7C:
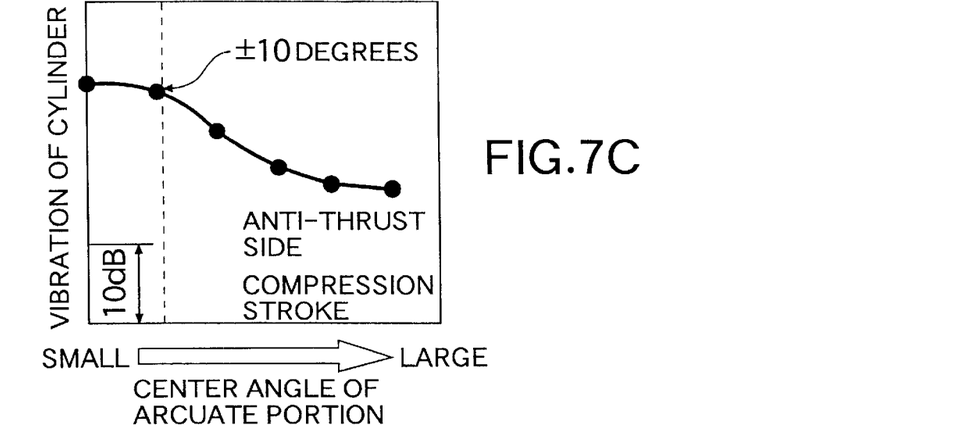

FIG. 7C shows the relationship between the center angle of the arcuate portion of the cross section of the skirt 12 on the anti-thrust side and the vibration of the cylinder. As can be seen from FIG. 7C, if the center angle of the arcuate portion on the anti-thrust side is increased, the vibration of the cylinder is decreased gradually. In a region where the center angle of the arcuate portion exceeds ±10°, the rate of decrease in vibration of the cylinder is increased and hence, a remarkable effect can be expected.

Figure 8:
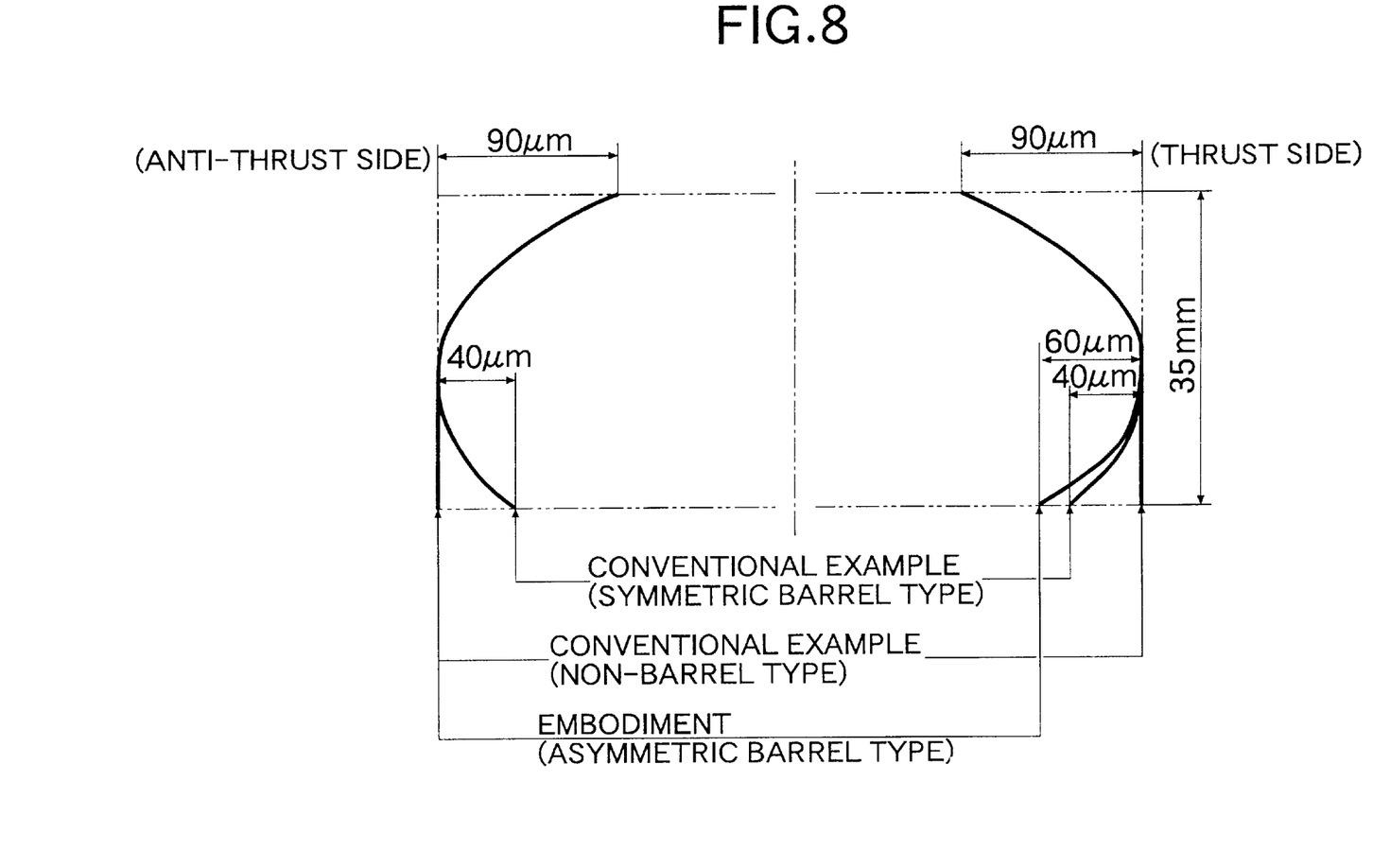
FIG. 8 is a diagram showing the shapes of the skirts in a second embodiment and in the conventional examples for comparison therebetween.

FIG. 8 shows the shape of the skirt 12 of the piston P in a second embodiment and the shapes of the skirts of the conventional pistons for comparison therebetween. As shown in FIG. 8, the height of the skirt 12 of the piston P in this embodiment is 35 mm, and the decrement in radius is 60 $\mu$m on the thrust side of the lower skirt portion 20, 0 $\mu$m on the anti-thrust side of the lower skirt portion 20, and 90 $\mu$m on both of the thrust side and the anti-thrust side of the upper skirt portion 19. The conventional pistons shown in FIG. 8 are of a non-barrel type (in which the decrement in radius of the lower skirt portion is set at 0 (zero)) and a symmetric barrel-type (the decrement in radius of the lower skirt portion is set at 40 $\mu$m on either of the thrust side and the anti-thrust side).

Figure 9A:
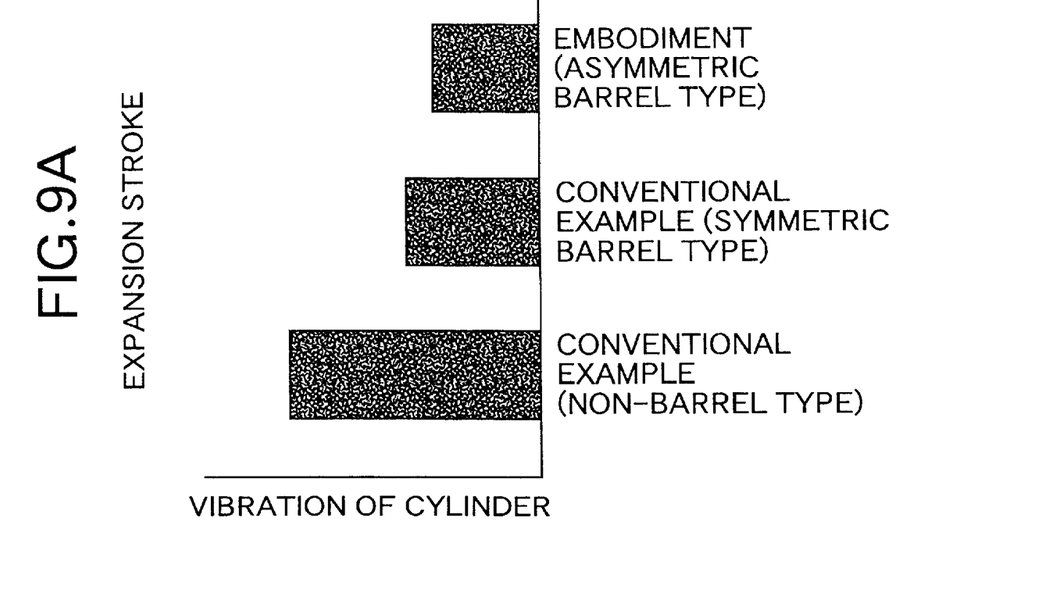
FIGS. 9A and 9B are graphs showing results in the second embodiment and in the conventional examples for comparison therebetween.
Figure 9B:
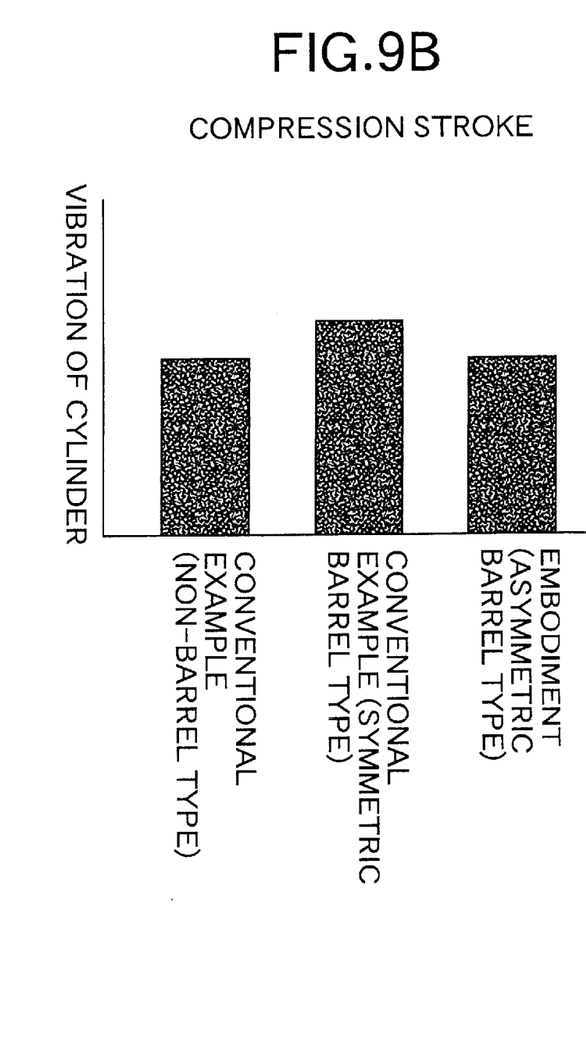

FIGS. 9A and 9B show the vibration of the cylinders according to the pistons P of the second embodiment and the vibration of the cylinders according to the conventional pistons for comparison therebetween. As can be seen from FIG. 9A, in the expansion stroke, the vibration of the cylinder is decreased in the order of the non-barrel type, the symmetric barrel type in the cylinder and the symmetric barrel type (in this embodiment). Thus, an effect provided by increasing the decrement in radius of the lower skirt portion 20 on the thrust side to 60 $\mu$m in this embodiment can be confirmed. As can be seen from FIG. 9B, in the compression stroke, the vibration of the cylinder of the symmetric barrel type piston is the largest, and the vibration of the cylinder of the asymmetric barrel type (of this embodiment) is equivalent to the vibration of the cylinder of the non-barrel type. Thus, an effect provided by equalizing the decrement in radius on the anti-thrust side to that in the piston of the non-barrel type (i.e., by reducing the decrement in radius on the anti-thrust side to 0 $\mu$m) can be confirmed.

Figure 10:
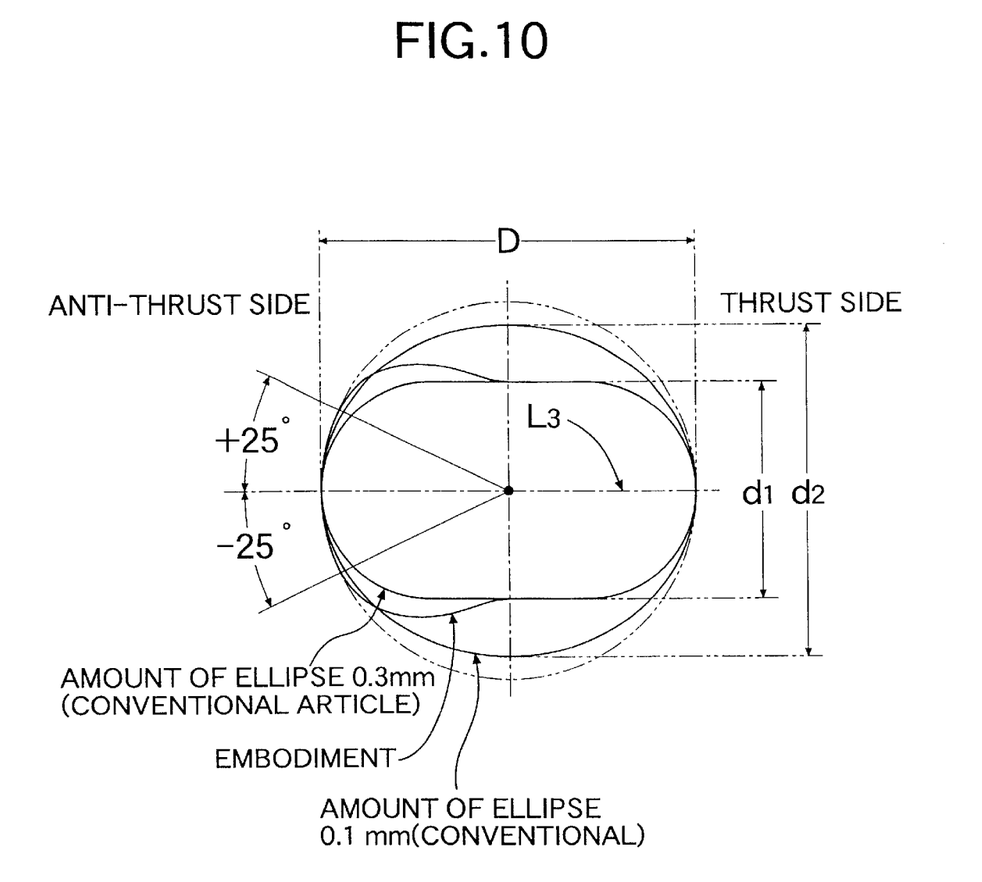
FIG. 10 is a diagram showing the cross-sectional shapes of the skirts of the asymmetric barrel-type pistons in a third embodiment and in the conventional examples for comparison therebetween.

FIG. 10 shows the cross-sectional shape of the skirt 12 of the piston P (of the asymmetric barrel type) of a third embodiment (the cross-sectional shape of the maximum-diameter portion 18) and the cross-sectional shapes of the skirts 12 of the conventional pistons for comparison therebetween. The conventional pistons (of an asymmetric barrel type) shown in FIG. 10 are of two elliptic shapes. In one of the elliptic shapes, the amount of the ellipse (D-$d_1$) is 0.1 mm. In the piston of this third embodiment, the amount of ellipse on the thrust side is equal to that in the conventional piston which is 0.3 mm, but the skirt 12 of the piston of this embodiment is of the non-circular shape having the arcuate portion in the range of ±25° with respect to the axis $L_3$ on the anti-thrust side.

Figure 11A:
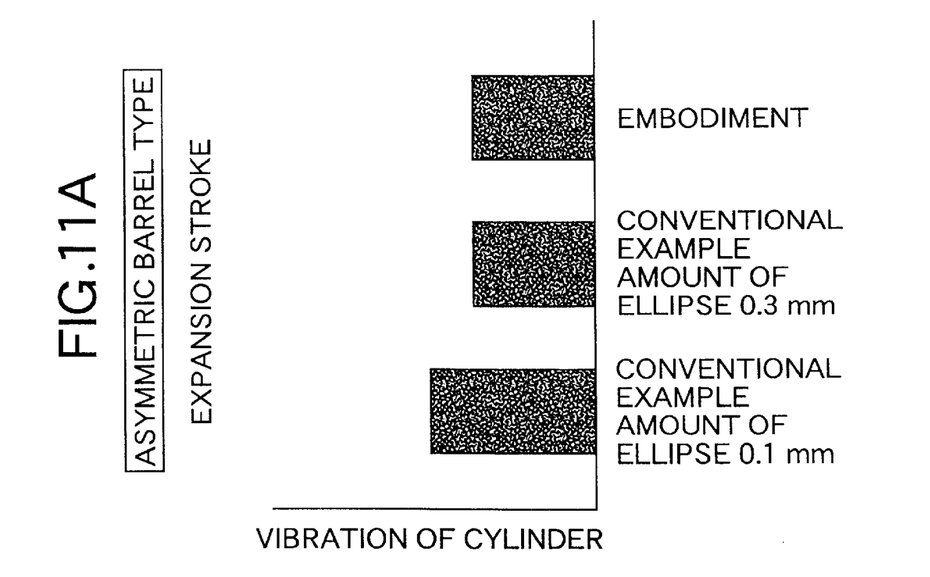
FIGS. 11A and 11B are graphs showing results in the asymmetric barrel-type pistons in the third embodiment and in the conventional examples for comparison therebetween.
Figure 11B:
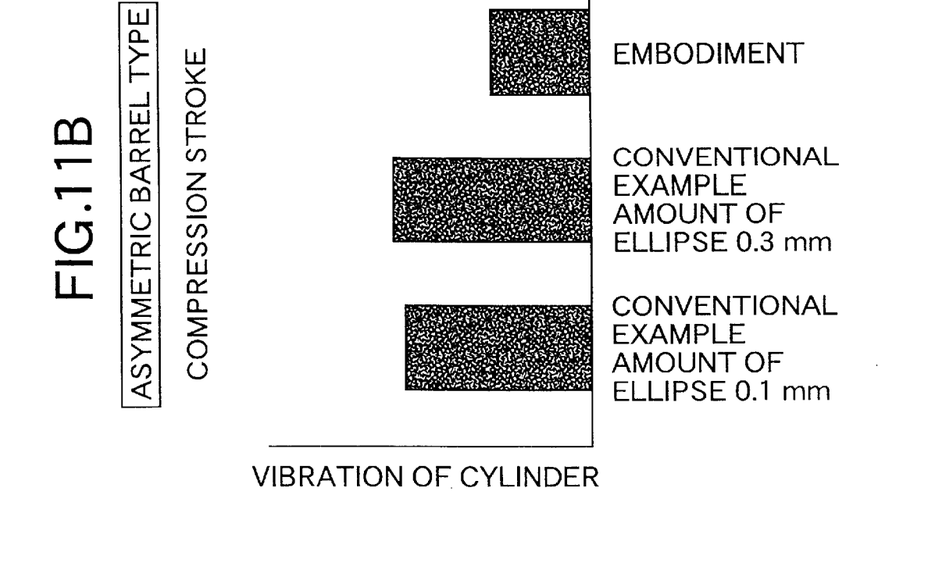

FIGS. 11A and 11B show the vibrations of the cylinders (the piston slap sounds) with the piston P of the third embodiment shown in FIG. 10 and with the conventional pistons for comparison therebetween. As can be seen from FIG. 11B, in the compression stroke, the vibration of the cylinder is decreased in the order of the conventional piston having the amount of ellipse of 0.3 mm, the conventional piston having the amount of ellipse of 0.1 mm and the piston P of this embodiment, and thus, an effect provided by providing the arcuate portion in the range of ±25° in this embodiment can be confirmed. In the expansion stroke, the vibration of the cylinder of the conventional piston having the amount of ellipse of 0.1 mm is the largest, and the vibration of the cylinder with the piston P of this embodiment is suppressed to the level equivalent to that of the conventional piston having the amount of ellipse of 0.3 mm. Thus, an effect provided by equalizing the cross-sectional shape on the thrust side to that of the conventional piston having the amount of ellipse of 0.3 mm can be confirmed.

Figure 12A:
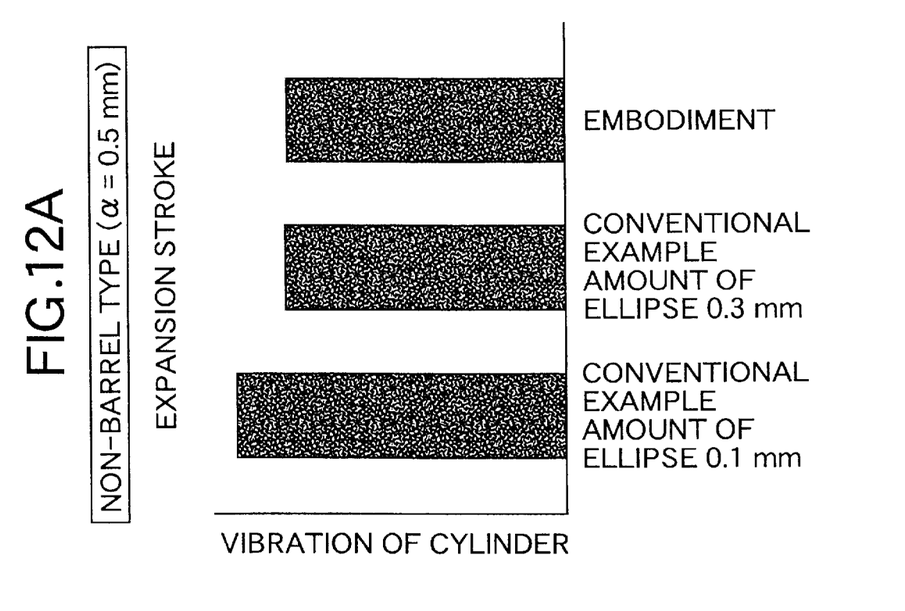
FIGS. 12A and 12B are graphs showing results in the non-barrel type pistons in the third embodiment and in the conventional examples for comparison therebetween.
Figure 12B:
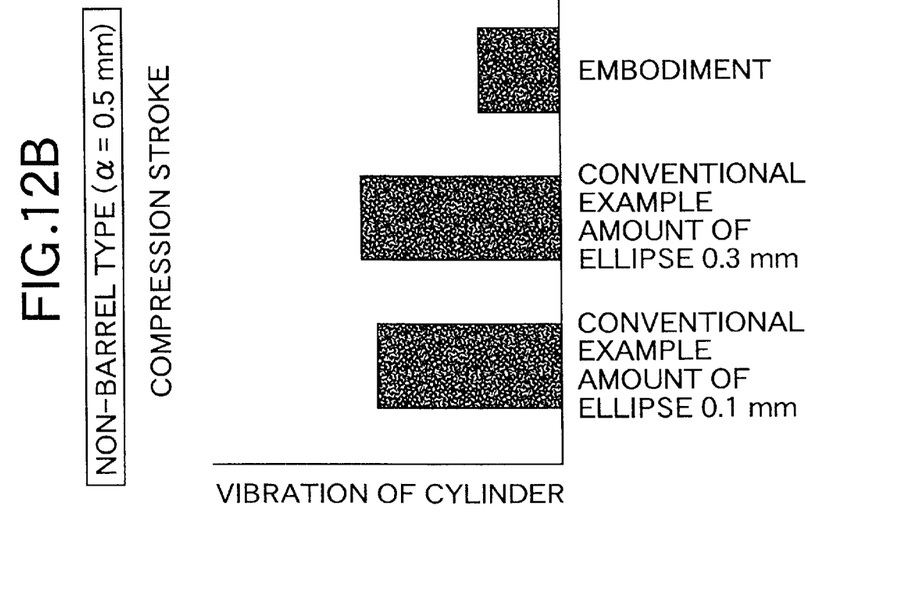

FIGS. 12A and 12B show the vibrations of the cylinders (the piston slap sounds) with the non-barrel type (straight type) pistons having a piston pin offset amount a equal to 0.5 mm and having the three cross-sectional shapes shown in FIG. 10 for comparison therebetween. It can be seen from FIGS. 12A and 12B that the vibration of the cylinder with even the non-barrel type piston can be reduced in the compression stroke, as in the case of the asymmetric barrel type shown in FIGS. 11A and 11B.

Figure 13A:
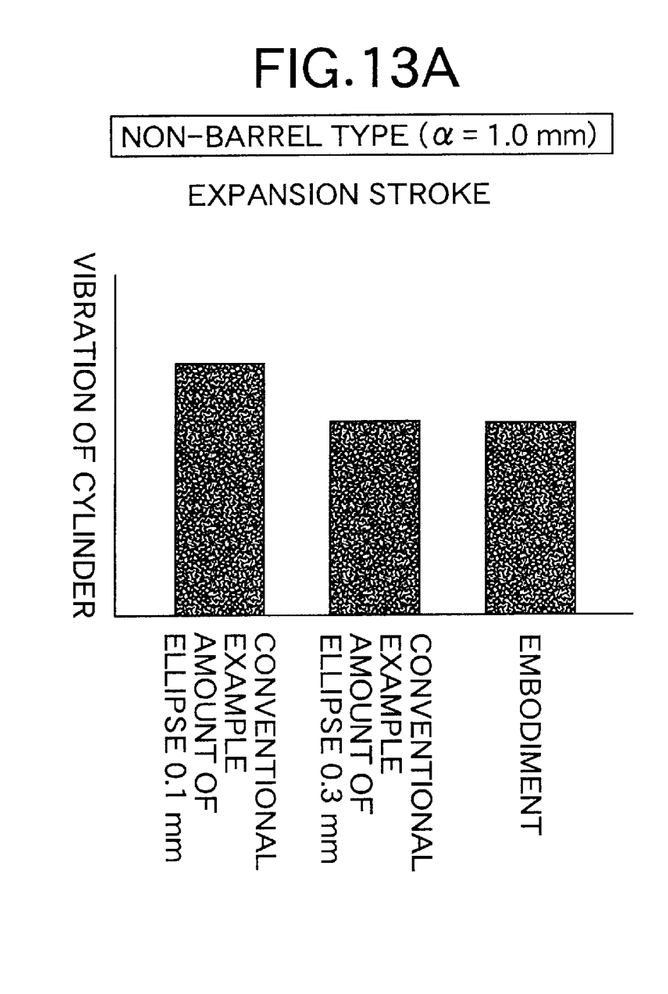
FIGS. 13A and 13B are graphs showing results in the asymmetric barrel-type pistons in the third embodiment and in the conventional examples for comparison therebetween.
Figure 13B:
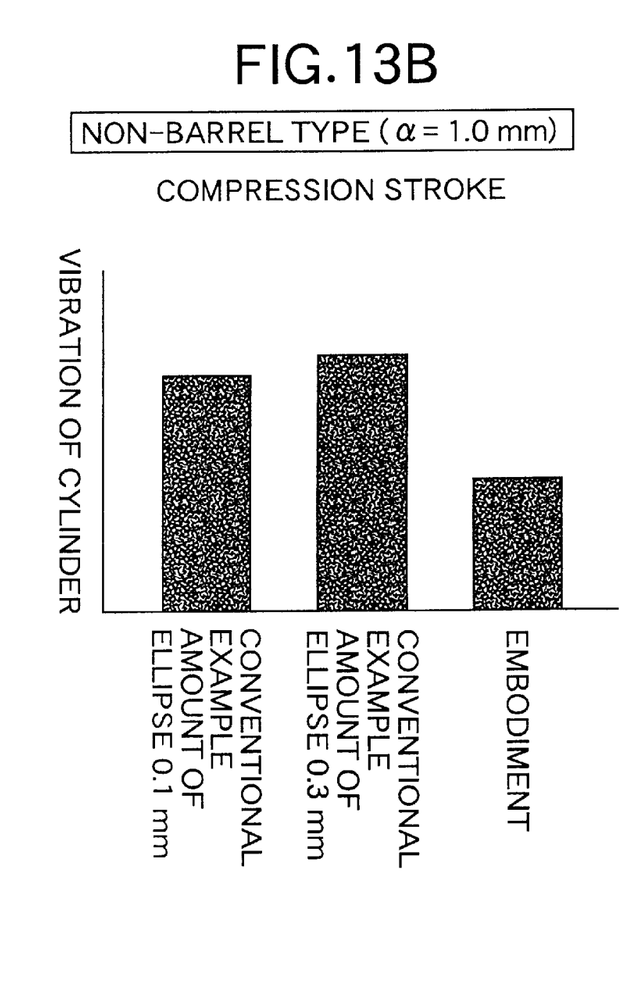

FIGS. 13A and 13B show the vibrations of the cylinders with the pistons having a piston pin offset amount a increased from 0.5 mm shown in FIGS. 12A and 12B to 1.0 mm. As can be seen by comparison of FIGS. 13A and 13B with FIGS. 12A and 12B, the vibration of the cylinder in the expansion stroke is largely decreased with an increase in piston pin offset amount a, on the one hand, and the vibration of the cylinder in the compression stroke is increased slightly, on the other hand. The reason is that in the expansion stroke, the abutment of the skirt 12 starting from its lower end having a low rigidity is promoted by an increase in counterclockwise moment $M_1$ shown in FIG. 4A to reduce the vibration of the cylinder, on the one hand, and in the compression stroke, the abutment of the skirt 12 starting from its upper end having a high rigidity is promoted by an increase in clockwise moment $M_3$ shown in FIG. 5B to increase the vibration of the cylinder, on the other hand.

Although some embodiments of the present invention have been described in detail, it will be understood that the present invention is not limited to the above-described embodiment, and various modifications may be made without departing from the spirit and scope of the invention defined in claims.

For example, the piston P for the 4-cycle internal combustion engine has been illustrated in the embodiments, but the present invention is applicable to a piston for an engine other than the 4-cycle internal combustion engine. The effect provided by forming the cross-sectional shape of the piston P asymmetric on the thrust side and on the anti-thrust side is also obtained in the piston P of the non-barrel type, but the piston slap sound reducing effect can be enhanced further effectively by combining the piston P of the non-barrel type with the piston of the asymmetric barrel type.

What is claimed is:

1. A piston for an internal combustion engine, including a barrel-type skirt comprised of an upper skirt portion provided above a maximum-application diameter portion and a lower skirt portion provided below the maximum-diameter portion, the upper and lower skirt portions having radii smaller than that of said maximum-diameter portion such that on a thrust side of said piston, the radii of the upper and lower skirt portions are decreased from said maximum-diameter portion, respectively, whereas on an anti-thrust side of the piston, the radius of the upper skirt portion is decreased from said maximum-diameter portion and the radius of the lower skirt portion is maintained the same as of the maximum-diameter portion.

* * * * *